(12) United States Patent
Zhao et al.

(10) Patent No.: US 12,080,887 B2
(45) Date of Patent: Sep. 3, 2024

(54) IRON-BASED CATHODE MATERIAL FOR SODIUM-ION BATTERY, PREPARATION METHOD THEREOF, AND CORRESPONDING SODIUM-ION FULL BATTERY

(71) Applicant: SUZHOU GAOBO ENERGY STORAGE SCITECH CO., LTD., Suzhou (CN)

(72) Inventors: Jianqing Zhao, Suzhou (CN); Shiyu Li, Suzhou (CN); Lijun Gao, Suzhou (CN)

(73) Assignee: SUZHOU GAOBO ENERGY STORAGE SCITECH CO., LTD., Suzhou (CN)

( * ) Notice: Subject to any disclaimer, the term of this patent is extended or adjusted under 35 U.S.C. 154(b) by 760 days.

(21) Appl. No.: 17/251,909

(22) PCT Filed: Dec. 25, 2019

(86) PCT No.: PCT/CN2019/128296
§ 371 (c)(1),
(2) Date: Dec. 14, 2020

(87) PCT Pub. No.: WO2021/114401
PCT Pub. Date: Jun. 17, 2021

(65) Prior Publication Data
US 2021/0202946 A1  Jul. 1, 2021

(30) Foreign Application Priority Data

Dec. 9, 2019 (CN) .......................... 201911251387.7
Dec. 9, 2019 (CN) .......................... 201911252756.4

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0404* (2013.01); *H01M 4/0471* (2013.01);
(Continued)

(58) Field of Classification Search
CPC .... H01M 4/5825; H01M 4/136; H01M 4/625; H01M 4/0471; H01M 4/133;
(Continued)

(56) References Cited

U.S. PATENT DOCUMENTS

2002/0192553 A1* 12/2002 Barker ................ H01M 4/5815
429/231.9
2003/0013019 A1*  1/2003 Barker ................. C01B 25/455
429/231.95

(Continued)

FOREIGN PATENT DOCUMENTS

CN          1723578 A     1/2006
CN        103078111 A     5/2013
(Continued)

OTHER PUBLICATIONS

Fang et al., Recent Developments in Cathode Materials for Na Ion Batteries, Acta Physico-Chimica Sinica 2017, 33(1), 211-241 (Oct. 11, 2016).

*Primary Examiner* — Imran Akram
(74) *Attorney, Agent, or Firm* — SZDC Law PC

(57) ABSTRACT

The present invention discloses an iron-based cathode material for a sodium-ion battery, which comprises a $Na_3Fe_2(SO_4)_3F$ material and a carbon-based material embedded into the bulk structure of $Na_3Fe_2(SO_4)_3F$ material. The weight percentage of the carbon-based material is ranked between 1% and 10%. The present invention also provides a method for preparing the above-mentioned iron-based cathode material for a sodium-ion battery, and a corresponding sodium-ion full battery using the $Na_3Fe_2(SO_4)_3F$-based (Continued)

cathode material. The $Na_3Fe_2(SO_4)_3F$ cathode material ensures desired electrochemical sodium storage performance, involving high specific sodium storage capacity, improved cycle stability and superior rate performance in comparison with that of various pristine $Na_xFe_y(SO_4)_z$ materials. The actual operating potential of the reported sodium-ion full battery in the present invention is significantly higher than the output potential of existing commercial sodium-ion full batteries, and the increase in battery energy density is also achieved.

5 Claims, 5 Drawing Sheets

(51) Int. Cl.
    *H01M 4/36*     (2006.01)
    *H01M 4/587*     (2010.01)
    *H01M 4/62*     (2006.01)
    *H01M 10/054*     (2010.01)
    *H01M 10/0567*     (2010.01)
    *H01M 10/0568*     (2010.01)
    *H01M 10/0569*     (2010.01)
    *H01M 10/058*     (2010.01)

(52) U.S. Cl.
    CPC ........... *H01M 4/364* (2013.01); *H01M 4/582* (2013.01); *H01M 4/587* (2013.01); *H01M 4/625* (2013.01); *H01M 10/054* (2013.01); *H01M 10/0567* (2013.01); *H01M 10/0568* (2013.01); *H01M 10/0569* (2013.01); *H01M 10/058* (2013.01); *H01M 2300/0037* (2013.01)

(58) Field of Classification Search
    CPC .... H01M 4/1397; H01M 4/364; H01M 4/582; H01M 4/583
    See application file for complete search history.

(56) References Cited

U.S. PATENT DOCUMENTS

| | | | |
|---|---|---|---|
| 2007/0160519 A1* | 7/2007 | Barker | H01M 10/052 423/305 |
| 2014/0234700 A1* | 8/2014 | Moriwaka | H01M 4/625 429/223 |
| 2015/0017322 A1 | 1/2015 | Reynaud et al. | |
| 2015/0132640 A1* | 5/2015 | Balaya | H01M 4/54 429/231.1 |
| 2016/0200850 A1* | 7/2016 | Hatanaka | C08F 226/06 526/260 |

FOREIGN PATENT DOCUMENTS

| | | | | |
|---|---|---|---|---|
| CN | 105355886 A | | 2/2016 | |
| CN | 106744778 A | * | 5/2017 | ............. C01B 25/45 |
| CN | 106848236 A | | 6/2017 | |
| CN | 108321374 A | * | 7/2018 | |
| CN | 108511751 A | * | 9/2018 | ........ H01M 10/0525 |
| CN | 108539157 A | | 9/2018 | |
| CN | 108682827 A | | 10/2018 | |
| CN | 109192982 A | | 1/2019 | |
| CN | 110336021 A | | 10/2019 | |
| KR | 20190090403 A | * | 8/2019 | |
| WO | WO-2006105253 A2 | * | 10/2006 | ............. C01B 25/45 |
| WO | WO-2013162473 A1 | * | 10/2013 | .......... H01M 10/054 |
| WO | 2018011576 A1 | | 1/2018 | |
| WO | 2019135827 A1 | | 7/2019 | |

* cited by examiner

IRON-BASED CATHODE MATERIAL FOR SODIUM-ION BATTERY, PREPARATION METHOD THEREOF, AND CORRESPONDING SODIUM-ION FULL BATTERY

This application is the National Stage Application of PCT/CN2019/128296, filed on Dec. 25, 2019, which claims priority to Chinese Patent Application Nos. 201911251387.7, filed on Dec. 9, 0219 and 201911252756.4, filed on Dec. 9, 0219, all of which are incorporated by reference for all purposes as if fully set forth herein.

FIELD OF THE INVENTION

The present invention relates to the technical field of electrode materials, and more particularly to an iron-based cathode material for a sodium-ion battery, as well as a preparation method and a corresponding sodium-ion full battery.

DESCRIPTION OF THE RELATED ART

With the rapid development of pure electric vehicles and large-scale energy storage systems, the demand for lithium-ion batteries as the core component has increased dramatically. However, the content of lithium in the earth's crust is very limited, and the recycling and reuse of lithium-ion batteries cannot be realized efficiently, resulting in an increasingly higher sale price of lithium-ion batteries. This affects the promotion and application of new energy electric vehicles and energy storage power stations.

The sodium-ion batteries show a very similar operating mechanism to lithium-ion batteries. Through the reversible intercalation and deintercalation of sodium ions between a cathode and an anode, energy storage and conversion are realized between chemical energy and electric energy in sodium-ion batteries. Abundant sodium resources can contribute to a considerable reduction in production cost of sodium-ion batteries; hence, the sodium-ion battery is considered to be an ideal energy storage device for the development of new energy fields in the future. However, due to the lack of desirable electrode materials, particularly of cathode materials, the existing sodium-ion batteries have many problems, such as low sodium storage capacity, low operating voltages, poor cycling stability and poor high-rate performance.

At present, the existing cathode materials for sodium-ion batteries mainly include layered transition metal oxides and polyanionic compounds. The chemical formula of the layered transition metal oxide cathode material can be expressed as $Na_{1-x}MO_2$, where M=Mn, Ni, Co, and Ti, etc., and the layered structure shows the characteristic of being deficient in sodium ion. Polyanionic cathode materials mainly include: vanadium-based phosphates, such as $NaVPO_4F$, $Na_3V_2(PO_4)_3$ and $Na_3V_2(PO_4)_2F_3$; iron-based pyrophosphates, such as $Na_2FeP_2O_7$, $Na_7Fe_{4.5}(P_2O_7)_4$ and $Na_{3.32}Fe_{2.34}(P_2O_7)_2$; iron-based sulfates, such as $Na_xFe_y(SO_4)_z$, $Na_2Fe(SO_4)_2$, $Na_2Fe_2(SO_4)_3$, $Na_4Fe(SO_4)_3$, $Na_6Fe(SO_4)_4$ and $Na_6Fe_5(SO_4)_8$; and other materials.

The preparation process for the sodium-poor layered transition metal oxide cathode material is relatively complicated and requires high-temperature heat treatment. The calcination temperature is usually higher than 700° C., and the energy consumption during the material synthesis is large. In addition, the high price and toxicity of transition metals affect the economic and environmental benefits of such cathode materials. Moreover, the electrochemical sodium storage performance of such cathode materials is undesirable, with the specific sodium storage capacity lower than 110 mAh $g^{-1}$, the operating potential below 3.5 V vs. $Na^+/Na$, and the poor cycling stability and rate capability.

Among the polyanionic compounds, the vanadium-based phosphate cathode materials have higher operating potentials about 4.0 V vs. $Na^+/Na$. However, the vanadium element is highly toxic and expensive, which restricts the practical application of these cathode materials.

Due to the rich iron content in the earth's crust and its environmental friendliness, iron-based polyanionic cathode materials have gotten rapid development in recent years. However, the operating potential of a pyrophosphate cathode material is lower than 3.0 V vs. $Na^+/Na$, which leads to a low energy density. Therefore, iron-based sulfate materials are considered to be ideal cathode materials for sodium-ion batteries in the future.

Pure-phase $Na_xFe_y(SO_4)_z$ materials have disadvantages, such as presence of impurity phases, low electronic conductivity, and poor electrochemical performance for sodium storage in terms of low specific sodium storage capacity, poor cycle stability and inferior rate performance. Generally, the above-mentioned problems can be alleviated by compositing different carbon-based materials. The traditional methods include in-situ coating of a carbon layer by using an organic carbon source, and chemically compounding or physically mixing of a carbon-based material with high conductivity. Modification by in-situ coating of a carbon layer by using an organic carbon source is a conventional method to improve the conductivity and electrochemical performance of cathode materials. A typical example is a carbon-coated lithium iron phosphate cathode material. However, when this method is applied to the modification of $Na_xFe_y(SO_4)_z$ materials, the following problems are caused due to a very low preparation temperature of $Na_xFe_y(SO_4)_z$ materials that is generally lower than 450° C. 1. Carbonization of the organic carbon sources is insufficient, resulting in low conductivity of the prepared surface carbon coating layer, which leads to an undesirable effect on improving the conductivity of $Na_xFe_y(SO_4)_z$ materials. In general, the carbonization temperature of organic carbon needs to be higher than 750° C. to obtain a higher degree of graphitization and excellent electronic conductivity. 2. The in-situ coating of a carbon layer additionally introduces an interface with low electronic conductivity, which is not conducive to the charge transport for the $Na_xFe_y(SO_4)_z$ material as well as the sodium ion diffusion through the interface. 3. The surface carbon-layer coating has a very limited effect on the improvement of electronic conductivity of $Na_xFe_y(SO_4)_z$ bulk material and on the improvement of the charge transfer between $Na_xFe_y(SO_4)_z$ particles.

Chinese Patent Publication No. CN108682827A discloses a carbon composite cathode material for a sodium-ion battery and an associated preparation method. A carbon-based material is successfully embedded into the bulk structure of $Na_xFe_y(SO_4)_z$ material through the solid-state mixing and post-annealing processes under the low-temperature heat treatment. As a result, the production process is simple, and the yield of target material is significantly improved. In addition, the production of impurity phases is also inhibited. However, the surface modification and composite construction with the carbon-based material will not change the atomic arrangement in the crystal structure of the $Na_xFe_y(SO_4)_z$ cathode material as well as the electron cloud distribution between elements and structural channels for the sodium-ion diffusion. Therefore, the irreversible oxidation of Fe element and the formation of impurity phases cannot be effectively suppressed during the preparation of the $Na_xFe_y(SO_4)_z$ material. The structural collapse caused by phase transition and enrichment of reaction stress during the electrochemical sodium storage process cannot also be ameliorated. Consequently, the above-mentioned carbon-compositing strategy cannot significantly improve the electrochemical performance of the polyanionic sodium iron sulfate cathode material, and fails to obtain desirable sodium storage capacity, cycle stability and high-rate performance.

Therefore, there is an urgent need in this field to obtain a composite cathode material, in which the carbon-based material is well compounded with a sodium-ion cathode material, in order to solve present issues for superior sodium-ion batteries, such as low sodium storage capacity, low operating potential, poor cycle stability, poor rate capability, high production cost, etc.

SUMMARY OF THE INVENTION

The technical problem to be solved by the present invention is to provide a $Na_3Fe_2(SO_4)_3F/C$ composite material. The composite material is used as an iron-based cathode material for a sodium-ion battery, to ensure the specific sodium storage capacity and greatly improve the cycling stability and rate performance, where the electrochemical performance for sodium storage is obviously better than that of various pure-phase $Na_xFe_y(SO_4)_z$ material.

To solve the above technical problems, the present invention provides an iron-based cathode material for a sodium-ion battery, which comprises a $Na_3Fe_2(SO_4)_3F$ material and a carbon-based material embedded into the bulk (interior) structure of $Na_3Fe_2(SO_4)_3F$ material. In the iron-based cathode material for a sodium-ion battery, the weight percentage of the carbon-based material is ranked between 1 and 10%.

According to the present invention, the weight percentage of the carbon-based material is in a range of 1-10%, such as, 1%, 2%, 5%, 8%, 10%, etc.

Preferably, the carbon-based material is selected from the group consisting of carbon nanotubes, carbon fibers, graphene, reduced graphene oxide, and amorphous carbon.

In another aspect, the present invention provides a method for preparing the iron-based cathode material for a sodium-ion battery, which comprises the following steps:

S1: mixing anhydrous ferrous sulfate, sodium sulfate and sodium fluoride at a molar ratio of 1:2:1 with a carbon-based material at a certain content, followed by the ball milling under a protective atmosphere, and drying the milled mixture to obtain a cathode material precursor; and S2: under a sintering atmosphere, sintering the cathode material precursor at a temperature between 300 and 450° C. for a duration time between 1 and 24 h to obtain the composite iron-based cathode material for a sodium-ion battery.

Preferably, ferrous sulfate is obtained by drying the hydrated ferrous sulfate in vacuum with the drying temperature preferably at 200° C. and the drying time in a range of 1-48 h.

Preferably, in Step S1, the carbon-based material is added in an amount within the range of 1-10% based on the total weight of anhydrous ferrous sulfate, sodium sulfate and sodium fluoride.

Preferably, in Step S1, the ball-to-material ratio during the ball milling is in a range of 0.1-100, the ball milling medium is one of stainless steel balls, $ZrO_2$ balls and agate balls, and the protective atmosphere is nitrogen gas or argon gas.

Preferably, in Step S1, a solvent is added during the ball milling, and the solvent includes, but is not limited to, at least one of ethanol, acetone, ethylene glycol, and N-methylpyrrolidone.

Preferably, in Step S1, the speed of ball milling is in a range of 100-1200 r/min, and the time of ball milling is in a range of 1-72 h.

Preferably, in Step S1, the drying is performed in vacuum or under nitrogen or argon atmosphere, the drying temperature is in a range of 80-120° C., and the drying time is in a range of 1-24 h.

Preferably, in Step S2, the sintering atmosphere is nitrogen or argon gas.

In another aspect, the present invention also provides a sodium-ion full battery, which has a positive electrode prepared from the $Na_3Fe_2(SO_4)_3F/C$ cathode material, a conductive carbon material and a binder.

Preferably, a method for preparing the sodium-ion full battery comprises the following steps:

(1) mixing the $Na_3Fe_2(SO_4)_3F/C$ cathode material, a conductive carbon material and a binder in a solvent, followed by coating the resulting mixture on an aluminum foil as a current collector, and drying to obtain a cathode plate;

(2) mixing a hard carbon anode material, a conductive carbon material and a binder in a solvent, followed by coating the resulting mixture on a copper foil as a current collector, and drying to obtain an anode plate; and (3) assembling the cathode plate and the anode plate with a separator, a spacer, a spring within cathode and anode shells, followed by adding an electrolyte, and sealing to obtain the sodium-ion full battery.

Preferably, in Step (1), the conductive carbon material is acetylene black, the binder is polyvinylidene fluoride, and the solvent is N-methylpyrrolidone; and the weight ratio of the $Na_3Fe_2(SO_4)_3F/C$ cathode material, the conductive carbon material and the binder is 8:1:1.

Preferably, in Step (2), the conductive carbon material is acetylene black, the binder is polyvinylidene fluoride, and the solvent is N-methylpyrrolidone; and the weight ratio of the hard carbon anode material, the conductive carbon material and the binder is 7:2:1.

Preferably, in Step (3), the electrolyte comprises sodium perchlorate as a solute with a concentration of 1 mol/L, and ethylene carbonate and dimethyl carbonate in a volume ratio of 1:1 as a solvent, in which 5 wt. % of vinylene carbonate is added as an additive.

As compared with the prior art, the present invention has the following beneficial effects.

1. In the present invention, the crystal structure of the $Na_3Fe_2(SO_4)_3F$ material is greatly stabilized by incorporating negatively-charged $F^-$ ion during the preparation, thus effectively inhibiting the oxidation of Fe element and the formation of impurity phases during the preparation of the material, and improving the yield of the target material. As a cathode material, the prepared $Na_3Fe_2(SO_4)_3F$ can ensure the specific sodium storage capacity, and greatly improve the cycling stability and rate performance. The electrochemical performance for sodium storage is significantly better than that of various pure-phase $Na_xFe_y(SO_4)_z$ material. Compared with other cathode materials such as sodium-containing layered transition metal oxides and polyanionic vanadium-based phosphates, the $Na_3Fe_2(SO_4)_3F$ cathode material has obvious advantages in terms of high operating potential and energy density.

2. By adding a carbon-based material to the reactants, the carbon-based material can be embedded into the bulk structure of the $Na_3Fe_2(SO_4)_3F$ material, to connect the $Na_3Fe_2$ $(SO_4)_3F$ particles serially and acts as a bridge for the charge transfer, thus significantly improving the conductivity of the $Na_3Fe_2(SO_4)_3F$ cathode material. Compared with the pure-phase $Na_3Fe_2(SO_4)_3F$ cathode material, the cycling stability and high-rate performance of the $Na_3Fe_2(SO_4)_3F/C$ composite cathode material in the electrochemical sodium storage process are further improved, so the present material is an ideal cathode material for a sodium-ion battery. In addition, the carbon-based material is not affected by the preparation parameters, such as calcination temperature and holding time for the synthesis of the $Na_3Fe_2(SO_4)_3F$ material, so the content (mass percentage) control is very easy.

3. Ferrous sulfate, sodium sulfate and sodium fluoride are used as raw materials. The utilization rate of raw materials is 100%, and no waste gas and harmful waste liquid are generated during the synthesis, and the production cost is low, so the present material is suitable for high-efficiency large-scale industrial production. Solid-state mixing by a ball milling and low-temperature heat treatment under an inert atmosphere are used, and the calcination temperature is generally not higher than 400° C., so the production process is very simple.

4. During the preparation process of sodium-ion full battery of the present invention, no waste gas, waste liquid and solid by-products are generated, and no environmental pollution is caused. The raw materials used include ferrous sulfate, sodium sulfate and sodium fluoride, which are extremely rich in resources. Compared with the use of Co, Ti, Cu and V elements in the existing sodium-ion full battery, the environmental compatibility is very good, and the present invention is green and environmentally friendly. Commercial product hard carbon (HC) anode material is used, and assembled into $Na_3Fe_2(SO_4)_3F//HC$ or $Na_3Fe_2(SO_4)_3F/C//HC$ sodium-ion full battery. The present invention is suitable for the massive production and scalable application. It has been verified that the actual operating potential of $Na_3Fe_2(SO_4)_3F//HC$ or $Na_3Fe_2(SO_4)_3F/C//HC$ sodium-ion full battery is 3.5 V, which is obviously higher than the output potential of the existing commercial sodium-ion full batteries. Moreover, the effect on increasing the energy density of the battery is also significant, with an increase up to 15%. In addition, the cycle life and power density are also improved to a certain extent.

DETAILED DESCRIPTION OF THE PREFERRED EMBODIMENTS

The present invention will be further described below referred to the accompanying drawings and specific examples, so that those skilled in the art can better understand and implement the present invention; however, the present invention is not limited thereto.

In the following examples, the terms involving SEM, HRTEM and CNF used herein are all professional terms in the art. The SEM refers to scanning electron microscope, HRTEM refers to high resolution transmission electron microscope, and CNF refers to carbon nanofibers.

EXAMPLE 1

Preparation of $Na_3Fe_2(SO_4)_3F/CNF$ Cathode Material for Sodium-Ion Battery

1. Ferrous sulfate heptahydrate was dried in an oven at 200° C. for 10 h to obtain anhydrous ferrous sulfate.

2. 0.4675 g of sodium sulfate, 1.00 g of anhydrous ferrous sulfate, 0.1379 g of sodium fluoride and 0.0803 g of (5 wt%) carbon fibers were weighed, and added to a 50 mL zirconia jar. 34 g of zirconia balls was added, and the ball-to-material ratio was set to 20:1. Argon was fed for protection, and the material was ball milled at a rotation speed of 200 r/min and a revolution speed of 500 r/min for 6 h.

3. The resulting ball-milled composite precursor was transferred to a tube furnace, thermally treated under an argon atmosphere, and calcinated at 350° C. for 5 h. The calcined product was ground into powder to obtain a composite material containing 5% carbon fibers, which was designated as $Na_3Fe_2(SO_4)_3F/CNF$-5% cathode material.

Figure 1:
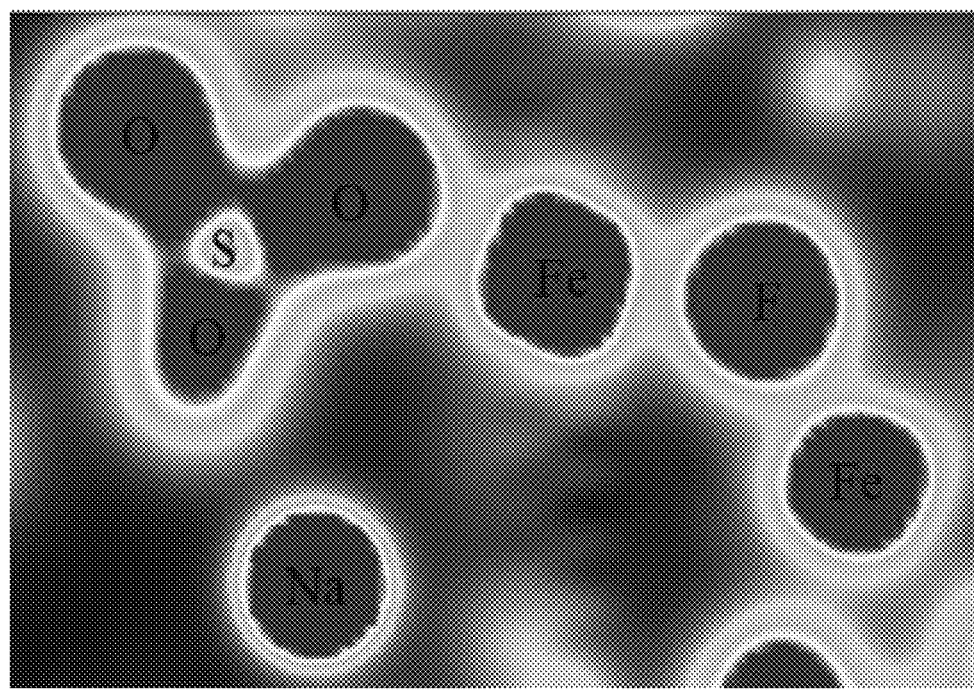
FIG. 1 shows the electron cloud distribution of the $Na_3Fe_2(SO_4)_3F$ material.

FIG. 1 shows the electron cloud distribution of the $Na_3Fe_2(SO_4)_3F$ material. It can be seen from FIG. 1 that the incorporation of $F^-$ ion makes the electron cloud distribution between Fe and Fe, and Fe and O atoms more uniform, which improves the interaction between atoms, effectively stabilizes the crystal structure of the material, and inhibits the oxidation of Fe element as well as the formation of impurity phases during the preparation of the material, and thus is conducive to improving the sodium storage capacity, cycling stability and rate performance of the cathode material for sodium-ion batteries.

Figure 2:
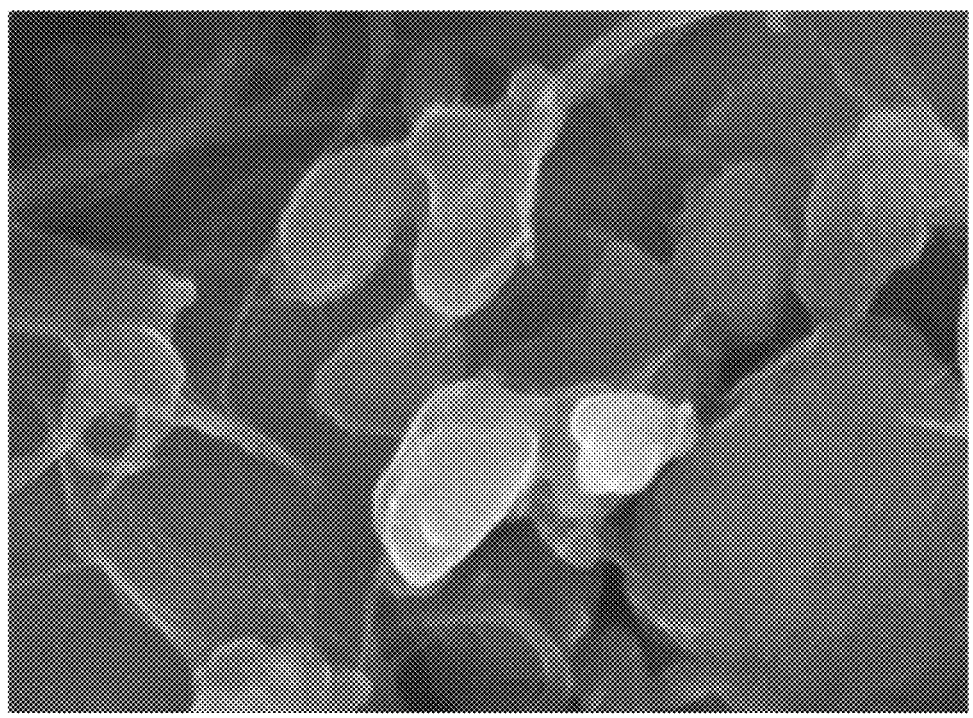
FIG. 2 is an SEM image of the $Na_3Fe_2(SO_4)_3F/CNF$-5% material.

FIG. 2 is an SEM image of the $Na_3Fe_2(SO_4)_3F/CNF$-5% cathode material. It can be seen from FIG. 2 that the $Na_3Fe_2(SO_4)_3F/CNF$-5% cathode material is in the form of micron-scale bulk particles, in which the carbon fibers are clearly wound between the particles to form a micro-nano structure with resembling ribbon-wound particles.

Figure 3:
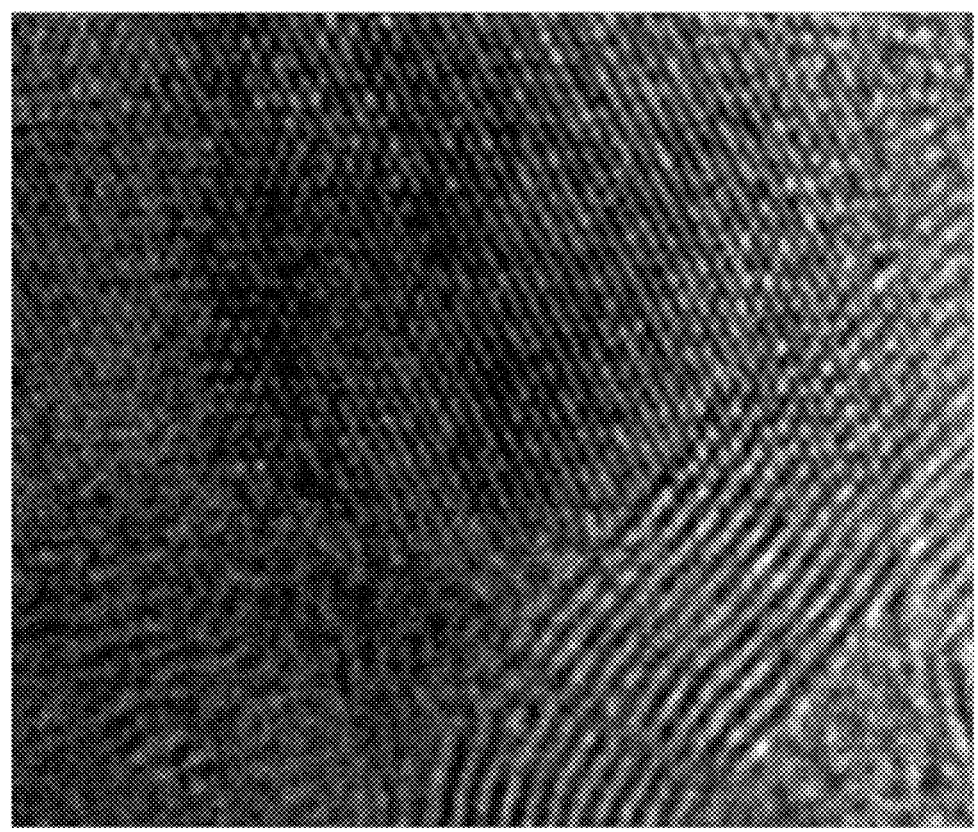
FIG. 3 is an HRTEM image of the $Na_3Fe_2(SO_4)_3F/CNF$-5% material.

FIG. 3 is an HRTEM image of the $Na_3Fe_2(SO_4)_3F/CNF$-5% cathode material. It can be seen from FIG. 3 that the $Na_3Fe_2(SO_4)_3F$ material shows high crystallinity, and the carbon fibers are graphitized and tightly embedded into the bulk structure of $Na_3Fe_2(SO_4)_3F$ particle.

EXAMPLE 2

Preparation of Sodium-Ion Button Battery 0.8 g of the $Na_3Fe_2(SO_4)_3F/CNF$-5% cathode material, 0.1 g of a conductive carbon material (acetylene black), and 0.1 g of a binder (polyvinylidene fluoride) were weighed at a weight ratio of 8:1:1, and uniformly dispersed in N-methyl pyrrolidone as a solvent. The resulting mixed slurry was evenly coated on an aluminum foil, and dried under vacuum at 120° C. for 10 h to obtain a cathode plate. A thin metal sodium sheet was used as the counter electrode, and the cathode plate, a separator, the counter electrode, a spacer, and a spring were placed in sequence in a CR2032-type coin cell, and a electrolyte comprising sodium perchlorate as the solute at a concentration of 1 mol/L and propylene carbonate as the solvent was added, and then sealed to obtain a sodium-ion button battery.

Figure 4:
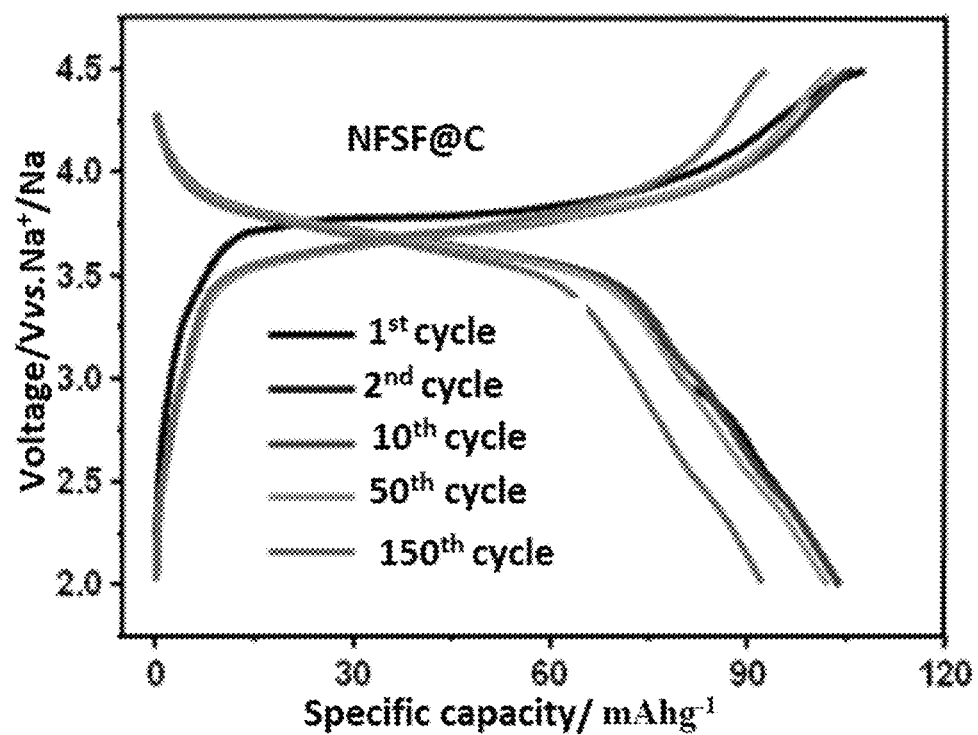
FIG. 4 shows charge/discharge curves of a coin cell prepared in Example 2 in different cycles at a current density of 0.1 C (1 C=120 mA $g^{-1}$)
Figure 5:
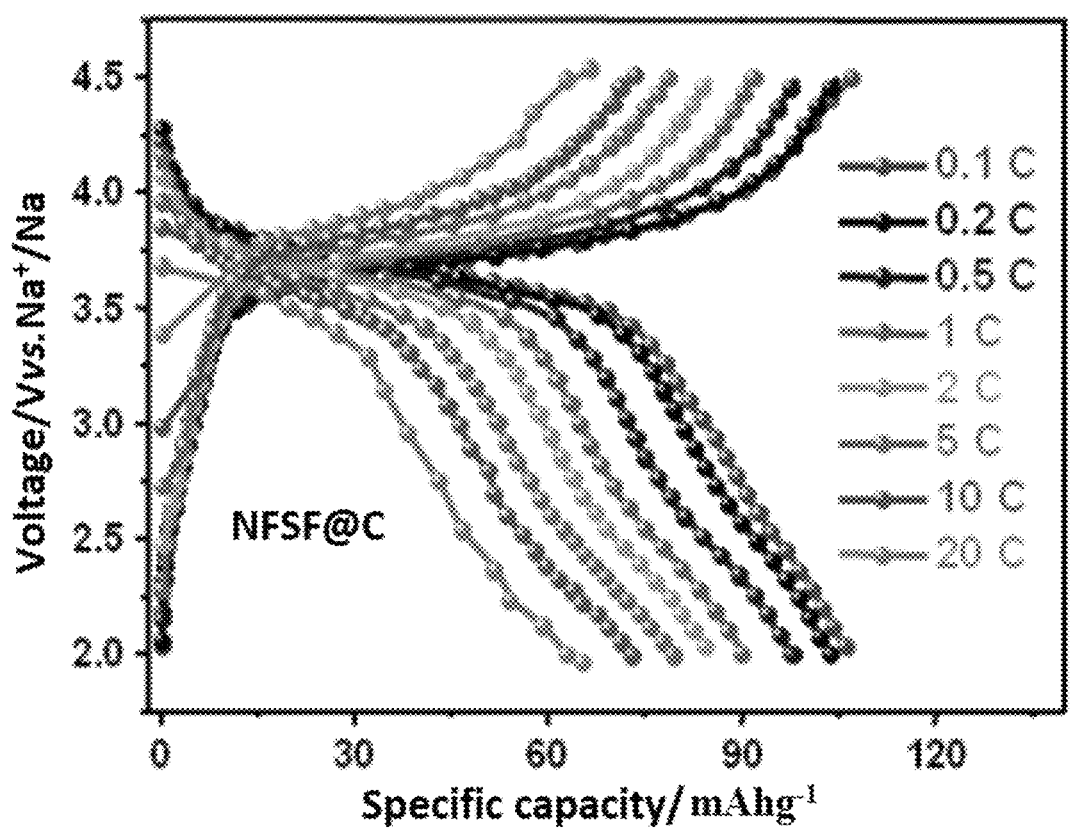
FIG. 5 shows charge/discharge curves in the second cycle of the coin cell prepared in Example 2 at different current densities.
Figure 6:
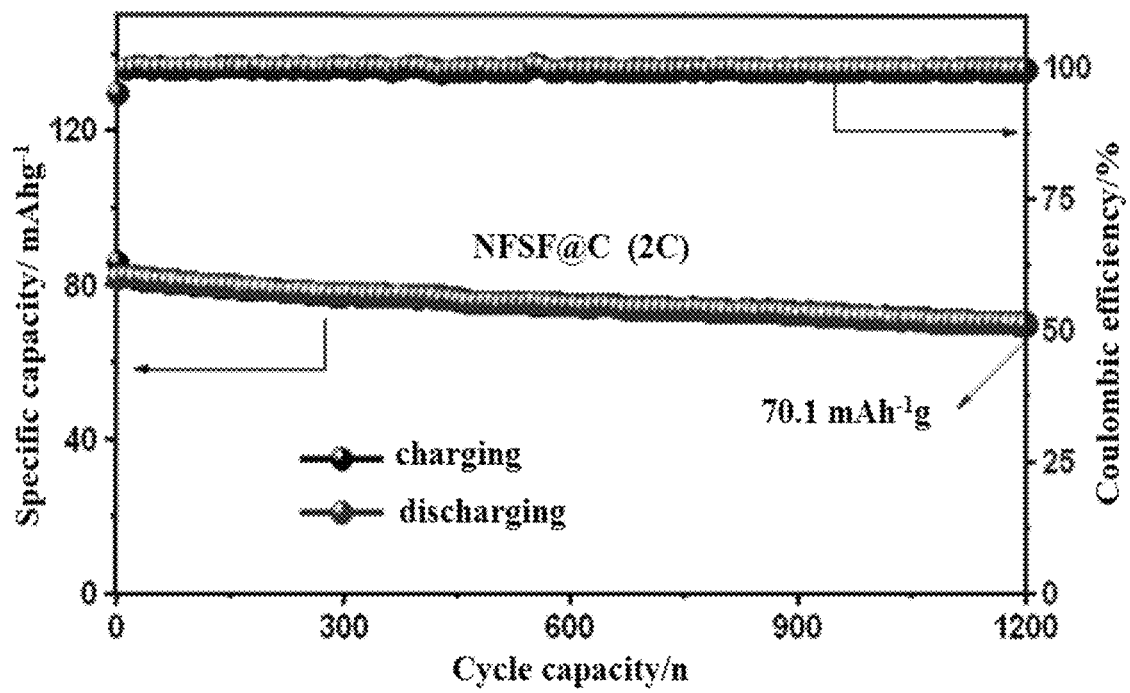
FIG. 6 shows the capacity retention curve and the coulombic efficiency of the coin cell prepared in Example 2 at a current density of 2 C for prolonged cycles.

FIGS. 4-6 show the electrochemical performance of the coin cell cycled in a voltage range of 2.0-4.5 V vs. $Na^+/Na$. FIG. 4 shows charge/discharge curves in different cycles at a current density of 0.1 C. It can be seen from FIG. 4 that the assembled half sodium-ion battery has high cycling stability, resulting in a specific initial discharge capacity of 109 mAh $g^{-1}$ in the first cycle, and retained 90 mAh $g^{-1}$ after 150 cycles.

FIG. 5 shows charge/discharge curves in the second cycle at different current densities. It can be seen from FIG. 5 that the assembled half sodium-ion battery has a higher operating voltage and better rate performance. The capacity is obtained at 65 mAh $g^{-1}$ at a current density of 20 C.

FIG. 6 shows the capacity retention curve and the coulombic efficiency at a current density of 2 C. It can be seen from FIG. 6 that the assembled half sodium-ion battery has good cycling stability at a high rate, and the specific discharge capacity after 1200 cycles at a current density of 2 C is still 70 mAh $g^{-1}$.

Figure 7:
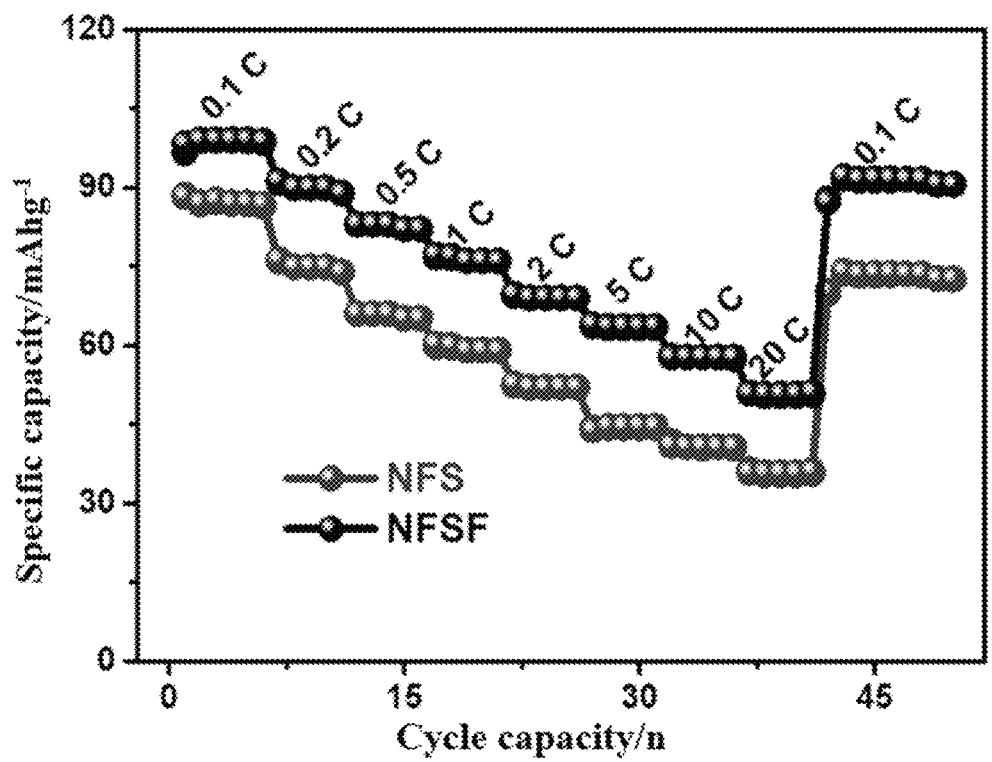
FIG. 7 shows the comparison of the rate performance of the $Na_6Fe_5(SO_4)_8$ material (NFS) prepared in Chinese Patent Publication No. CN108682827A and the $Na_3Fe_2(SO_4)_3F$ material (NFSF) prepared in the present invention.

FIG. 7 compares the rate performance of the $Na_6Fe_5(SO_4)_8$ material prepared in Chinese Patent Publication No. CN108682827A and the $Na_3Fe_2(SO_4)_3F$ material prepared in the present invention. It can be seen from FIG. 7 that the incorporation of $F^-$ ion can effectively improve the rate performance of such a cathode material. At a current density of 20 C, the specific discharge capacity of the $Na_3Fe_2(SO_4)_3F$ material is still 50 mAh $g^{-1}$. After 40 cycles of charging and discharging, the capacity at a current density of 0.1 C still remains at 90 mAh $g^{-1}$.

EXAMPLE 3

Preparation of a Sodium-Ion Full Battery 1. 0.8 g of the $Na_3Fe_2(SO_4)_3F$/CNF-5% cathode material, 0.1 g of acetylene black as a conductive carbon material, and 0.1 g of polyvinylidene fluoride as a binder were weighed at a weight ratio of 8:1:1, and dispersed in N-methyl pyrrolidone as a solvent. The uniformly mixed slurry was evenly coated on an aluminum foil, and dried under vacuum at 120° C. for 12 h to obtain a cathode plate.

2. 0.7 g of hard carbon anode material, 0.2 g of acetylene black as a conductive carbon material, and 0.1 g of polyvinylidene fluoride as a binder were weighed at a weight ratio of 7:2:1, and dispersed in N-methyl pyrrolidone as a solvent. The uniformly mixed slurry was evenly coated on a copper foil, and dried under vacuum at 120° C. for 12 h to obtain an anode plate.

3. The cathode plate, a separator, the anode plate, a spacer and a spring were placed in sequence in a CR2032-type coin cell. A electrolyte comprising sodium perchlorate as the solute at a concentration of 1 mol/L, ethylene carbonate and dimethyl carbonate in a volume ratio of 1:1 as the solvent, and 5 wt. % vinylene carbonate as the additive was added, and sealed to obtain a sodium-ion full battery.

Figure 8:
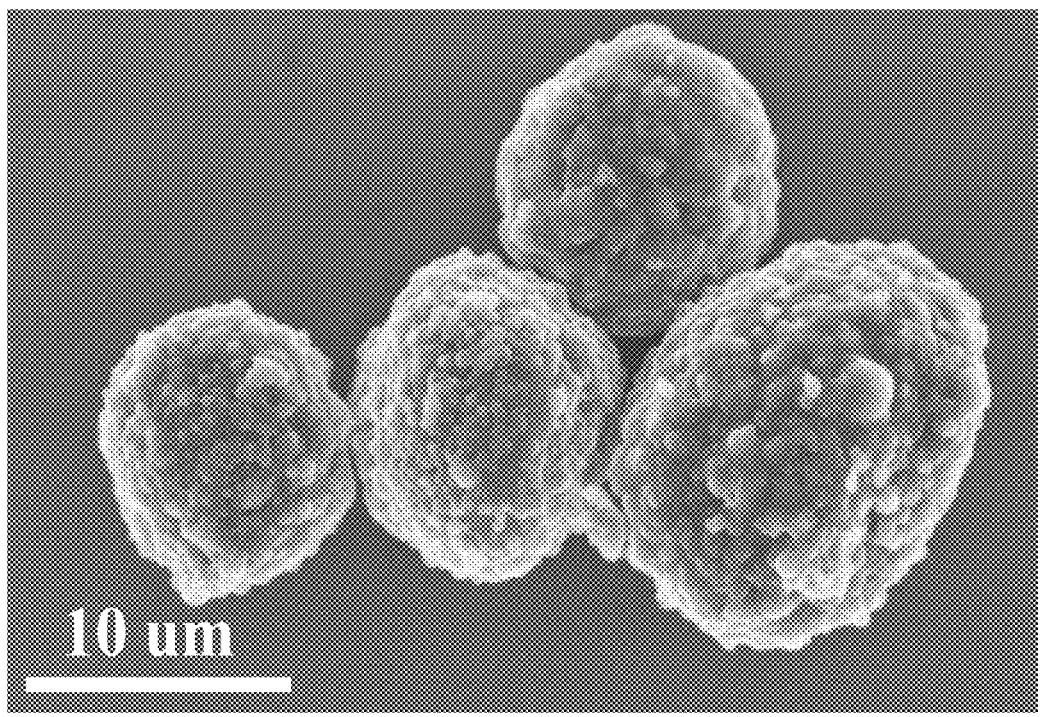
FIG. 8 is an SEM image of the hard carbon anode material in Example 3.

FIG. 8 is an SEM image of the hard carbon anode material. It can be seen from FIG. 8 that the hard carbon material is in the form of micron-scale spherical particles, which are aggregated from nano-scale primary particles.

Figure 9:
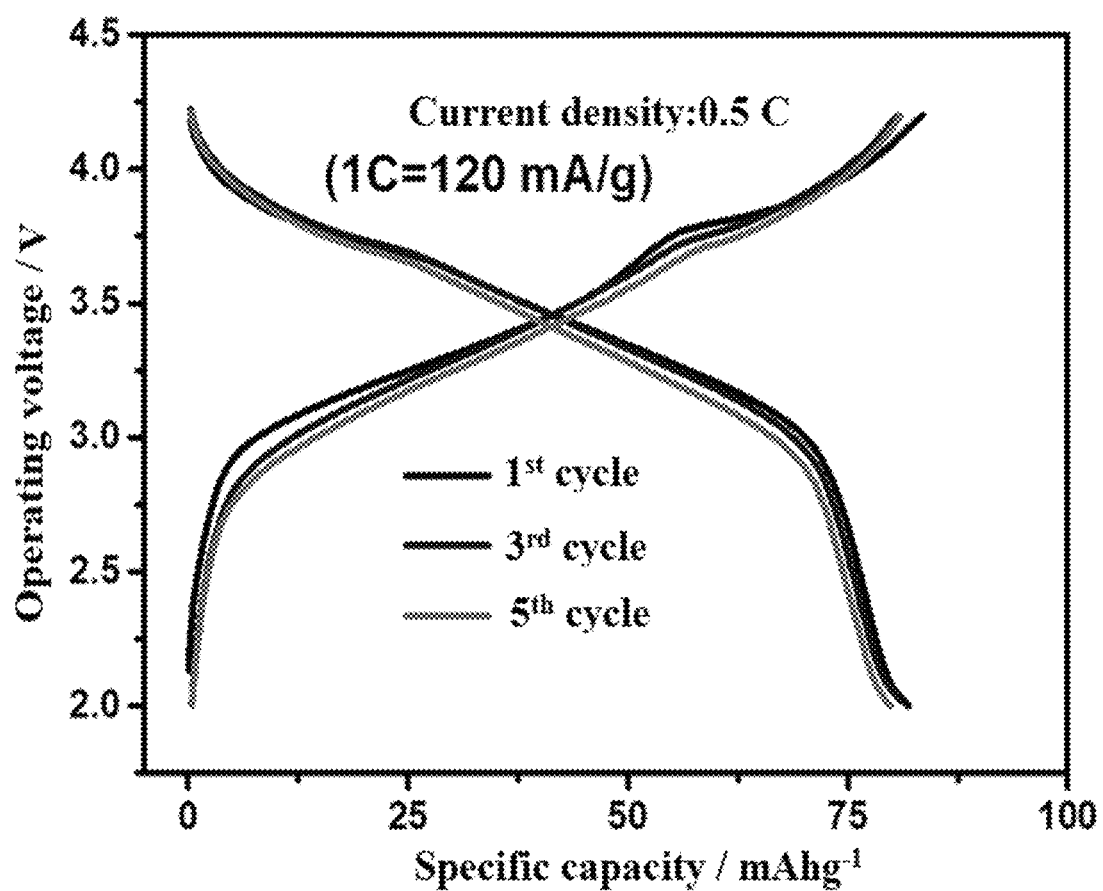
FIG. 9 is a charge/discharge curve of a sodium-ion full battery prepared in Example 3 at a current density of 0.5 C.

FIG. 9 shows charge/discharge curves in different cycles of the full battery at a current density of 0.5 C. It can be seen from FIG. 9 that the assembled full battery has a higher operating voltage and better charge/discharge specific capacity, and the specific discharge capacity at 0.5 C is up to 81 mAh $g^{-1}$ in the first cycle.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention. The scope of the present invention is defined by the appended claims.

What is claimed is:

1. A method for preparing an iron-based cathode material for a sodium-ion battery comprising steps of:
    S1: mixing anhydrous ferrous sulfate, sodium sulfate, and sodium fluoride at a molar ratio of 1:2:1 with a carbon-based material, followed by ball milling under a protective atmosphere, and drying the milled mixture to obtain a cathode material precursor; and
    S2: under a sintering atmosphere, sintering the cathode material precursor at a temperature between 300 and 450°C. for a duration time between 1 and 24 h to obtain the iron-based cathode material,
    wherein the iron-based cathode material comprises a $Na_3Fe_2(SO_4)_3F$ material and a carbon-based material embedded into the bulk structure of the $Na_3Fe_2(SO_4)_3F$ material, wherein in the iron-based cathode material, the weight percentage of the carbon-based material is ranked between 1% and 10%.

2. The method for preparing an iron-based cathode material for a sodium-ion battery according to claim 1, wherein in Step S1, the weight ratio of ball to material during the ball milling is in a range of 0.1-100, a ball milling medium is one of stainless steel balls, $ZrO_2$ balls and agate balls, and the protective atmosphere is nitrogen gas or argon gas.

3. The method for preparing an iron-based cathode material for a sodium-ion battery according to claim 2, wherein in Step S1, a solvent is added during the ball milling, and the solvent is selected from ethanol, acetone, ethylene glycol, N-methylpyrrolidone or any combination thereof; the speed of ball milling is in a range of 100-1200 r/min, and the time of ball milling is in a range of 1-72 h.

4. The method for preparing an iron-based cathode material for a sodium-ion battery according to claim 1, wherein in Step S1, the drying is performed in vacuum or under nitrogen or argon atmosphere, the drying temperature is in a range of 80-120° C., and the drying time is in a range of 1-24 h.

5. The method for preparing an iron-based cathode material for a sodium-ion battery according to claim 1, wherein in Step S2, the sintering atmosphere is nitrogen or argon.

* * * * *